(12) United States Patent
Aiba et al.

(10) Patent No.: US 8,125,876 B2
(45) Date of Patent: Feb. 28, 2012

(54) OBJECTIVE LENS, OPTICAL PICKUP APPARATUS USING THE SAME, OPTICAL RECORDING/REPRODUCTION APPARATUS USING THE SAME, AND METHOD OF CORRECTING ABERRATION USING THE SAME

(75) Inventors: Motoo Aiba, Tokyo (JP); Kiyoshi Toyota, Tokyo (JP); Hiroyuki Sakakibara, Tokyo (JP); Toyokazu Takahashi, Tokyo (JP); Kouhei Anju, Tokyo (JP); Kenichi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 12/605,500

(22) Filed: Oct. 26, 2009

(65) Prior Publication Data
US 2010/0103801 A1    Apr. 29, 2010

(30) Foreign Application Priority Data
Oct. 28, 2008   (JP) .................................. 2008-276319

(51) Int. Cl.
*G11B 7/135* (2006.01)
(52) U.S. Cl. .................................. 369/112.23
(58) Field of Classification Search .................. None
See application file for complete search history.

(56) References Cited

U.S. PATENT DOCUMENTS

| | | | |
|---|---|---|---|
| 6,418,108 B1* | 7/2002 | Ueda et al. | 369/112.23 |
| 2007/0268806 A1* | 11/2007 | Yamasaki et al. | 369/112.02 |
| 2008/0198465 A1* | 8/2008 | Saito et al. | 359/565 |

FOREIGN PATENT DOCUMENTS

| | | | |
|---|---|---|---|
| JP | 2000-131603 | | 5/2000 |
| JP | 2001-324673 | A | 11/2001 |
| JP | 2002-236253 | A | 8/2002 |
| JP | 2006-031901 | | 2/2006 |

* cited by examiner

*Primary Examiner* — Christopher R Lamb
(74) *Attorney, Agent, or Firm* — Wolf, Greenfield & Sacks, P.C.

(57) ABSTRACT

Provided is an objective lens for which expressions $0.83<(p_M/p_L)<1.17$ and $0.83<(p_M/p_T)<1.17$ or expressions $0.80<(p_M/p_L)<1.20$ and $0.86<(p_M/p_T)<1.14$ are satisfied, where $p_L$ is the ratio of fifth-order spherical aberration to third-order spherical aberration, the spherical aberrations being caused by a difference in the thickness of a cover layer of an optical recording medium, $p_T$ is the ratio of fifth-order spherical aberration to third-order spherical aberration, the spherical aberrations being caused by a change in the temperature of an environment of the objective lens, and $p_M$ is the ratio of fifth-order spherical aberration to third-order spherical aberration, the spherical aberrations being caused by a change in incident magnification.

17 Claims, 5 Drawing Sheets

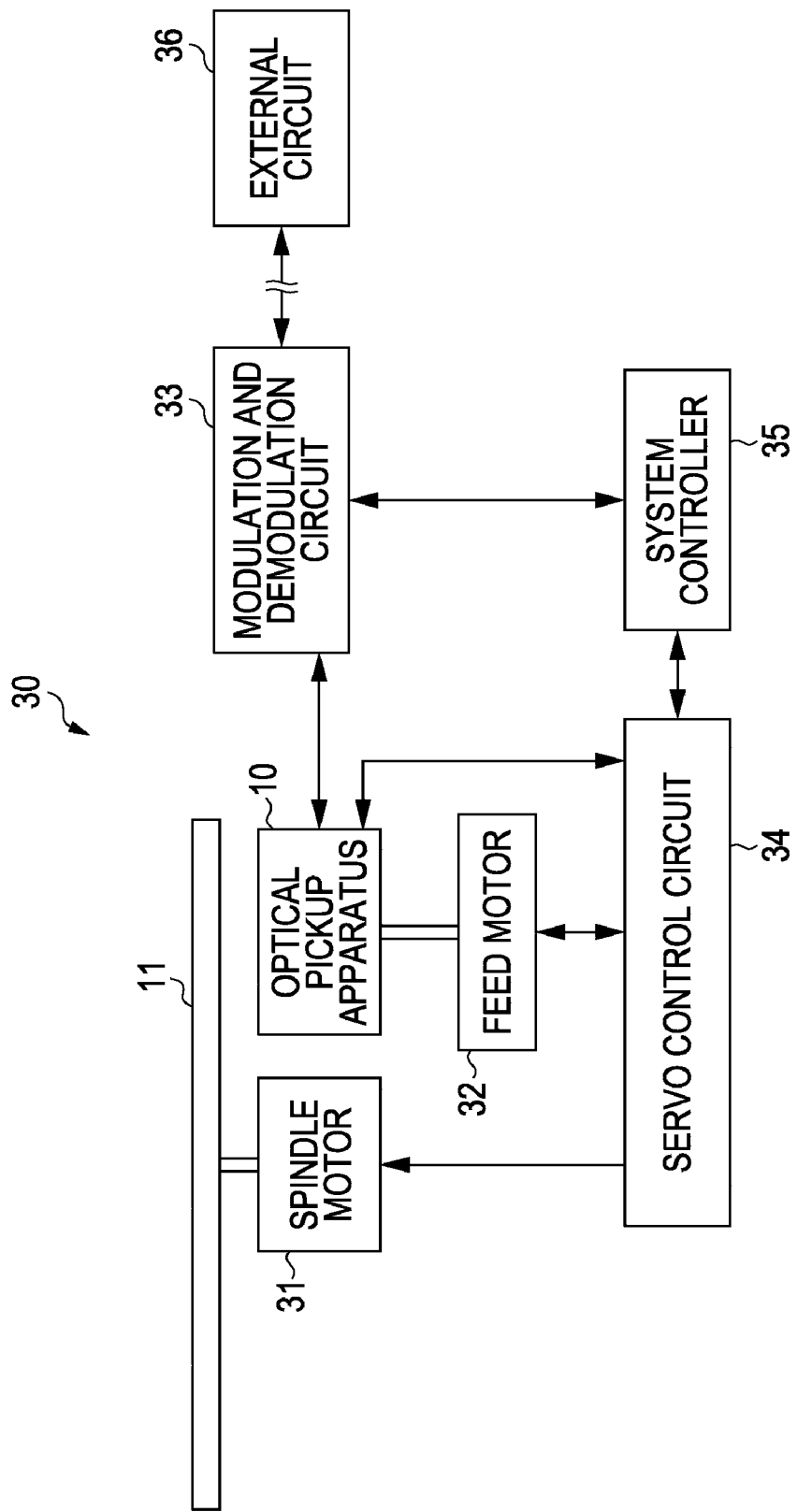

OBJECTIVE LENS, OPTICAL PICKUP APPARATUS USING THE SAME, OPTICAL RECORDING/REPRODUCTION APPARATUS USING THE SAME, AND METHOD OF CORRECTING ABERRATION USING THE SAME

BACKGROUND OF THE INVENTION

1. Field of the Invention

The present invention relates to an objective lens that is used for recording information on and/or reproducing information from an optical recording medium by using light at a wavelength of, for example, 405 nm (tolerance±8 nm). The present invention also relates to an optical pickup apparatus using the objective lens, an optical recording/reproduction apparatus using the objective lens, and a method of correcting aberration using the objective lens.

2. Description of the Related Art

A high-capacity recording medium called a Blu-ray Disc (BD, registered trademark) has been commercialized. Information is recorded on and/or reproduced from a BD by using light at a wavelength of 405 nm (tolerance±8 nm) and an optical lens having a numerical aperture equal to or greater than 0.80. Hereinafter, the term "blue band optical recording medium" refers to a Blu-ray Disc.

An objective lens used for a blue band optical recording medium has a numerical aperture equal to or greater than 0.80, which is larger than those of optical lenses used for existing optical recording media. When an objective lens has a large numerical aperture, spherical aberration becomes sensitive to variations in the thickness of the cover layer of an optical recording medium. Therefore, not only third-order spherical aberration but also fifth-order spherical aberration are not negligible. In particular, fifth-order spherical aberration is not negligible in the case of a multilayer recording medium, because a multilayer recording medium includes an intermediate layer disposed between recording layers and the thickness of the cover layer varies in accordance with the thickness of the intermediate layer.

Various mechanisms have been proposed in order to correct spherical aberration caused by a change or a manufacturing error in the thickness of the cover layer of an optical recording medium. For example, Japanese Unexamined Patent Application Publication No. 2000-131603 proposes a method of correcting aberration by moving a collimating lens along the optical axis and thereby changing the incident magnification of light entering an objective lens. With this method, aberration is cancelled by adjusting the movement of the collimating lens appropriately so that spherical aberration caused by a change in the incident magnification of the objective lens may have a polarity opposite that of spherical aberration caused by a change in the thickness of the cover layer.

Hereinafter, the term "magnification spherical aberration" refers to spherical aberration caused by a change in the incident magnification of the objective lens. Likewise, the term "disc spherical aberration" refers to spherical aberration caused by a change in the thickness of the cover layer, and the term "temperature spherical aberration" refers to spherical aberration caused by a change in temperature. Temperature spherical aberration is generated by such factors as expansion and contraction of the lens, a change in the refractive index of the material of the lens, and a change in the wavelength of incident light.

Japanese Unexamined Patent Application Publication No. 2006-31901 also proposes a technique for forming an objective lens for a large capacity optical recording medium having multi-layered recording layers while taking third- and fifth-order spherical aberrations into account.

SUMMARY OF THE INVENTION

Regarding the large capacity optical recording medium, and in particular, regarding an apparatus and a pickup for performing recording on and reproduction from a multi-layered optical recording medium, a plastic objective lens adapted to a multi-layered recording medium for the purpose of improving productivity has been the focus of much attention. However, the index of refraction of plastic is highly dependent on temperature and the coefficient of linear expansion of plastic is large, as compared with glass. Thus, the index of refraction and the shape of a plastic lens vary more significantly than those of a glass lens when temperature changes. Therefore, third- and fifth-order aberrations caused by a change in temperature are larger for a plastic lens than a glass lens.

As described above, the fifth-order spherical aberration is not negligible in an optical system having a numerical aperture equal to or greater than 0.80, and in particular, a numerical aperture of about 0.85, which is larger than those of optical systems for existing optical recording media. When a plastic objective lens is used in such an optical system, a problem arises in that the fifth-order spherical aberration caused by a change in temperature may not be removed. When the fifth-order spherical aberration is not removed, the light spot may become out of focus and performance of recording/reproduction of information may deteriorate.

It is desirable to suppress spherical aberration caused by a change in the temperature of an optical system having a numerical aperture of about 0.85.

According to an embodiment of the present invention, there is provided an objective lens, wherein, for the objective lens, expressions $0.83<(p_M/p_L)<1.17$ and $0.83<(p_M/p_T)<1.17$ or expressions $0.80<(p_M/p_L)<1.20$ and $0.86<(p_M/p_T)<1.14$ are satisfied, where $p_L$ is the ratio of fifth-order spherical aberration to third-order spherical aberration, the spherical aberrations being caused by a difference in the thickness of a cover layer of an optical recording medium, $p_T$ is the ratio of fifth-order spherical aberration to third-order spherical aberration, the spherical aberrations being caused by a change in the temperature of an environment of the objective lens, and $p_M$ is the ratio of fifth-order spherical aberration to third-order spherical aberration, the spherical aberrations being caused by a change in incident magnification.

The objective lens is used in an optical pickup apparatus, an optical recording/reproduction apparatus, and a method of correcting aberration according to embodiments of the present invention.

As described above, regarding the objective lens according to the embodiment, spherical aberration caused by a difference in the thickness of a cover layer of an optical recording medium (disc spherical aberration), spherical aberration caused by a change in incident magnification (magnification spherical aberration), and spherical aberration caused by a change in temperature (temperature spherical aberration) are taken into account. The objective lens is configured such that the quotient of the ratio of fifth-order magnification spherical aberration to third-order magnification spherical aberration and the ratio of fifth-order disc spherical aberration to third-order disc spherical aberration is within a predetermined range, and the quotient of the ratio of fifth-order magnification spherical aberration to third-order magnification spherical aberration and the ratio of fifth-order temperature spherical aberration to third-order temperature spherical aberration is within a predetermined range. With this configuration, as described below, when an optical system having a light source using light at a wavelength of about 405 nm and a lens having a numerical aperture equal to or greater than 0.80, and in particular, at about 0.85, is used for optical recording and reproduction, not only fifth-order disc spherical aberration but also fifth-order temperature spherical aberration can be favorably corrected. Therefore, a plastic lens can be used as an objective lens.

According to the embodiments of the present invention, when information is recorded and reproduced using an optical system having a numerical aperture of about 0.85, fifth-order spherical aberration caused by a change in temperature can be corrected.

BRIEF DESCRIPTION OF THE DRAWINGS

FIG. 2 is a schematic view of an optical recording/reproduction apparatus according to an embodiment the present invention;

DESCRIPTION OF THE PREFERRED EMBODIMENTS

Hereinafter, preferred embodiments of the present invention are described. However, the present invention is not limited to the embodiments described below. The embodiments of the present invention are described in the following order: [1] Optical Pickup Apparatus, [2] Optical Recording/Reproduction Apparatus, [3] Objective Lens, [4] Method of Correcting Aberration, and [5] Design Examples.

[1] OPTICAL PICKUP APPARATUS

Figure 1:
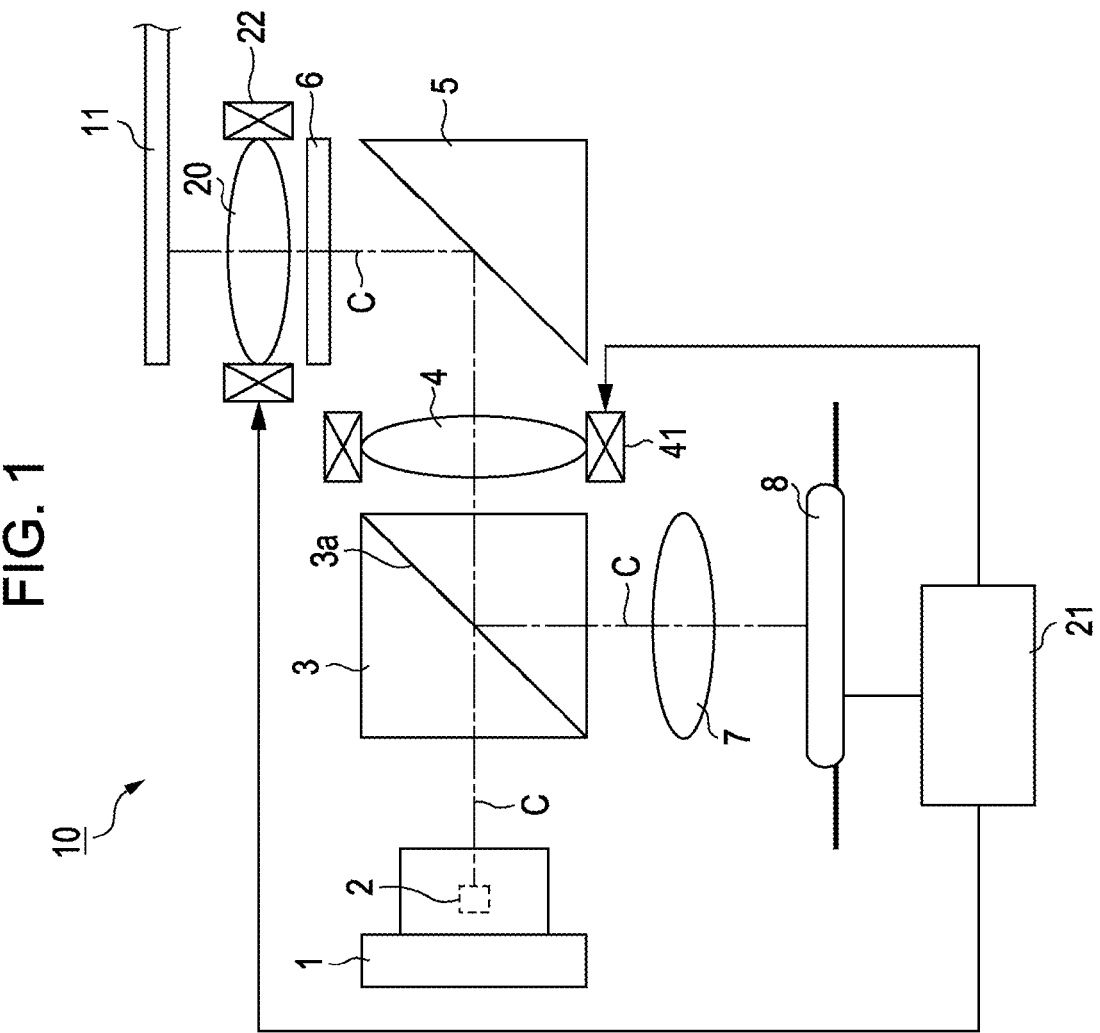
FIG. 1 is a schematic view of an optical pickup apparatus according to an embodiment the present invention.

FIG. 1 is a schematic view of an optical pickup apparatus 10 according to an embodiment of the present invention. In this embodiment, information signals are recorded on and reproduced from an optical recording medium 11. The optical recording medium 11 includes a reproduction-only recording layer or a phase-change recording layer having pits and bumps.

As shown in FIG. 1, the optical pickup apparatus 10 includes a light source 1. The light source 1 includes a light emitting device 2 that emits blue band light at a wavelength of, for example, 405±8 nm. When the optical pickup apparatus 10 reproduces an information signal from the optical recording medium 11, the light source 1 emits laser light having a constant power. When the optical pickup apparatus 10 records an information signal on the optical recording medium 11, the intensity of laser light emitted by the light source 1 is modulated by a drive controller (not shown) or the like in accordance with the information signal being recorded.

A polarizing beam splitter 3, which includes a polarization separation surface 3a, a collimating lens 4, and a mirror 5 are disposed in the path of light emitted from the light source 1. A quarter wavelength plate 6 and an objective lens 20 are disposed in the path of light reflected from the mirror 5. A condenser lens 7 and a photodetector 8 are disposed in the path of feedback light reflected from a recording surface (not shown) of the optical recording medium 11 and the polarization separation surface 3a of the polarizing beam splitter 3.

A controller 21 connected to the photodetector 8 converts the intensity of light detected by the photodetector 8 into a signal and processes the signal. The controller 21 outputs driving signals to an actuator 22 (driving unit) of the objective lens 20 and an actuator 41 of the collimating lens 4.

Regarding the optical pickup apparatus 10, the wavelength of laser light emitted by the light source is not particularly limited. For example, even when a semiconductor laser that emits laser light at a wavelength longer than 405 nm is used, the optical pickup apparatus 10 is useful in the case when a lens having a large numerical aperture, for which a higher order spherical aberration is significant, is used.

In the optical pickup apparatus 10, laser light is emitted from the light source 1, passes through the polarization separation surface 3a of the polarizing beam splitter 3, and enters the mirror 5 at a predetermined incident angle adjusted by the collimating lens 4. The mirror 5 changes the direction of the laser light by, for example, 90°. The laser light passes through the quarter wavelength plate 6 and enters the objective lens 20, which concentrates the laser light on a desired recording layer (not shown) of the optical recording medium 11.

Feedback light reflected from the optical recording medium 11 passes through the objective lens 20 and enters the quarter wavelength plate 6. While the light passes through the quarter wavelength plate to and fro, the polarization direction of the light is changed by 90°. The feedback light is reflected by the mirror 5, passes through the collimating lens 4, and enters the polarizing beam splitter 3. Since the polarization direction of the feedback light has been changed by 90°, the light is reflected by the polarization separation surface 3a and is concentrated on the photodetector 8 by the condenser lens 7.

In the optical pickup apparatus 10, focus servo control and tracking servo control are performed as described below. For focus servo control, for example, an astigmatic method can be used. In this case, the photodetector 8 includes, for example, a six-segment photodiode, and the condenser lens 7 is configured to provide astigmatism. The photodetector 8 outputs electric signals corresponding to the intensities of feedback light incident on respective segments of the photodiode, and the controller 21 performs predetermined operation on the electric signals, whereby a focus servo signal is generated. Focus servo control is performed by driving the actuator 22 of the objective lens 20 in accordance with the focus servo signal. Focus servo control may be performed by various methods other than the astigmatic method.

For tracking servo control, for example, a three beam method can be used. In this case, laser light is split into three beams by a diffraction grating or the like, the photodetector 8 detects feedback light of the beams, and the controller 21 performs an operation on the detected light signal, whereby a tracking servo signal is generated. Tracking servo control is performed by driving the actuator 22 of the objective lens 20 in accordance with the tracking servo signal. Tracking servo control may be performed by various methods other than the three beam method.

The photodetector 8 outputs electric signals corresponding to the intensities of feedback light incident on respective segments of the photodiode. When an information signal is reproduced from the optical recording medium 11, a predetermined operation is performed on the electric signal, so that a reproduction signal of the optical recording medium 11 is generated.

In the embodiment, the optical recording medium 11 has a disk-like shape. The optical recording medium 11 is rotated by a rotation mechanism (not shown). The entirety of the optical pickup apparatus 10 can be moved, for example, in a radial direction by a driving unit (not shown). With the rotation of the optical recording medium 11 and with the movement of the optical pickup apparatus 10 in the radial direction, the objective lens 20 can move to any desired position on the recording surface of the optical recording medium 11.

The optical pickup apparatus 10 includes the actuator 41 for moving the collimating lens 4. Magnification aberration is generated by moving the collimating lens 4, for example, along the optical axis C. As described below, magnification aberration is used for correcting spherical aberration caused by a difference in the thickness of cover layer of the optical recording medium 11 and spherical aberration caused by a change in the temperature of the environment of the objective lens 20.

In the embodiment, the optical pickup apparatus records information signals on and reproduces information signals from the optical recording medium 11, which is a phase-change recording medium or the like. However, the optical pickup apparatus can be used for various other optical recording media. For example, the optical pickup may record information signals on and reproduce information signals from a reproduction-only optical recording medium, a magneto-optical recording medium, or a card-type optical recording medium.

[2] OPTICAL RECORDING/REPRODUCTION APPARATUS

Referring to FIG. 2, an optical recording/reproduction apparatus according to an embodiment of the present invention is described. FIG. 2 is a schematic view of an optical recording/reproduction apparatus 30 including the optical pickup apparatus 10. The recording/reproduction apparatus 30 can be used for recording information signals on and reproducing information signals from the optical recording medium 11, which is a phase-change optical recording medium.

In the example shown in FIG. 2, the optical recording/reproduction apparatus 30 performs recording on and reproduction from the optical recording medium 11 of a phase-change type. However, an optical recording/reproduction apparatus according to an embodiment of the present invention may be modified in a variety of ways as an optical recording/reproduction apparatus including an optical pickup apparatus having an objective lens according to an embodiment of the present invention. That is, an optical recording medium used for recording and reproduction may be a reproduction-only optical recording medium, a magneto-optical recording medium, a card-shaped optical recording medium, or the like.

The optical recording/reproduction apparatus 30 includes a spindle motor 31 for rotating the optical recording medium 11, the optical pickup apparatus 10 for recording and reproducing information signals, and a feed motor 32 for moving the optical pickup apparatus 10 in the radial direction of the optical recording medium 11. The optical recording/reproduction apparatus 30 further includes a modulation and demodulation circuit 33 for performing predetermined modulation and demodulation operations, a servo control circuit 34 for performing servo control of the optical pickup apparatus 10 and the like, and a system controller 35 for controlling the entirety of the optical recording/reproduction apparatus 30.

The spindle motor 31 is controlled by the servo control circuit 34 and rotates at a predetermined number of revolutions. That is, the optical recording medium 11, on which recording is performed and from which reproduction is performed, is mounted on a drive shaft of the spindle motor 31, so that the optical recording medium 11 is rotated by the spindle motor 31 at a predetermined number of revolutions that is controlled by the servo control circuit 34.

When performing recording and reproduction, the optical pickup apparatus 10 emits laser light onto the optical recording medium 11, which is being rotated, and detects feedback light of the laser light. The optical pickup apparatus 10 is connected to the modulation and demodulation circuit 33. When recording an information signal, the optical pickup apparatus 10 is supplied with the information signal that has been input from an external circuit 36 and modulated by the modulation and demodulation circuit 33 in a predetermined manner. In accordance with the information signal supplied from the modulation and demodulation circuit 33, the optical pickup apparatus 10 modulates the intensity of laser light and irradiates the optical recording medium 11 with the laser light. When reproducing an information signal, the optical pickup apparatus 10 irradiates the optical recording medium 11, which is being rotated, with laser light having a predetermined intensity, generates a reproduction signal from feedback light of the laser light, and supplies the reproduction signal to the modulation and demodulation circuit 33.

As described above, the servo control circuit 34 (corresponding to the controller 21 of FIG. 1) is connected to the optical pickup apparatus 10. When recording and reproducing information signals, as described above, the optical pickup apparatus 10 generates a focus servo signal and a tracking servo signal from feedback light reflected from the optical recording medium 11, which is being rotated. The servo signals are supplied to the servo control circuit 34.

Signals detected by the photodetector of the optical pickup apparatus 10 is output to the modulation and demodulation circuit 33. The modulation and demodulation circuit 33 is connected to the system controller 35 and the external circuit 36. When the optical pickup apparatus 10 records an information signal on the optical recording medium 11, under the control of the system controller 35, the modulation and demodulation circuit 33 receives a signal to be recorded on the optical recording medium 11 from the external circuit 36 and modulates the signal in a predetermined manner. The signal modulated by the modulation and demodulation circuit 33 is supplied to the optical pickup apparatus 10. When the optical pickup apparatus 10 reproduces an information signal, under the control of the system controller 35, the modulation and demodulation circuit 33 receives a reproduction signal reproduced from the optical recording medium 11 by the optical pickup apparatus 10 and demodulates the reproduction signal in a predetermined manner. The signal demodulated by the modulation and demodulation circuit 33 is output from the modulation and demodulation circuit 33 to the external circuit 36.

When the optical pickup apparatus 10 records and reproduces information signals, the feed motor 32, which is driven in accordance with a control signal from the servo control circuit 34, moves the optical pickup apparatus 10 to a predetermined position in a radial direction of the optical recording medium 11. That is, the feed motor 32 is connected to the servo control circuit 34 and controlled by the servo control circuit 34.

Under the control of the system controller 35, the servo control circuit 34 controls the feed motor 32 so as to move the optical pickup apparatus 10 to a predetermined position at which the optical pickup apparatus 10 faces the optical recording medium 11. The servo control circuit 34 is also connected to the spindle motor 31. Under the control of the system controller 35, the servo control circuit 34 controls the rotation of the spindle motor 31. That is, when the optical pickup apparatus 10 records an information signal on and reproduces an information signal from the optical recording medium 11, the servo control circuit 34 controls the spindle motor 31 so that the optical recording medium 11 may be rotated at a predetermined number of revolutions.

The servo control circuit 34 is also connected to the optical pickup apparatus 10. When recording and reproducing information signals, the optical pickup apparatus 10 supplies the servo control circuit 34 with a reproduction signal and a servo signal. In accordance with the servo signal described above, the servo control circuit 34 performs focus servo control and tracking servo control using the actuator 22 (see FIG. 1) of the optical pickup apparatus 10. Moreover, the servo control circuit 34 controls the actuator 41 so as to adjust the position of the collimating lens 4, thereby correcting aberration.

In the optical recording/reproduction apparatus 30 of the embodiment, the collimating lens 4 of the optical pickup apparatus 10 corrects aberration caused by a difference in the thickness of the cover layer of the optical recording medium 11 and the aberration caused by a change in the temperature of the environment of the objective lens 20. Therefore, even if the objective lens 20 of the optical pickup apparatus 10 is made of plastic, aberration can be favorably corrected, whereby the effect of the aberration on the recording and reproduction performance can be suppressed.

[3] OBJECTIVE LENS

Figure 3A:
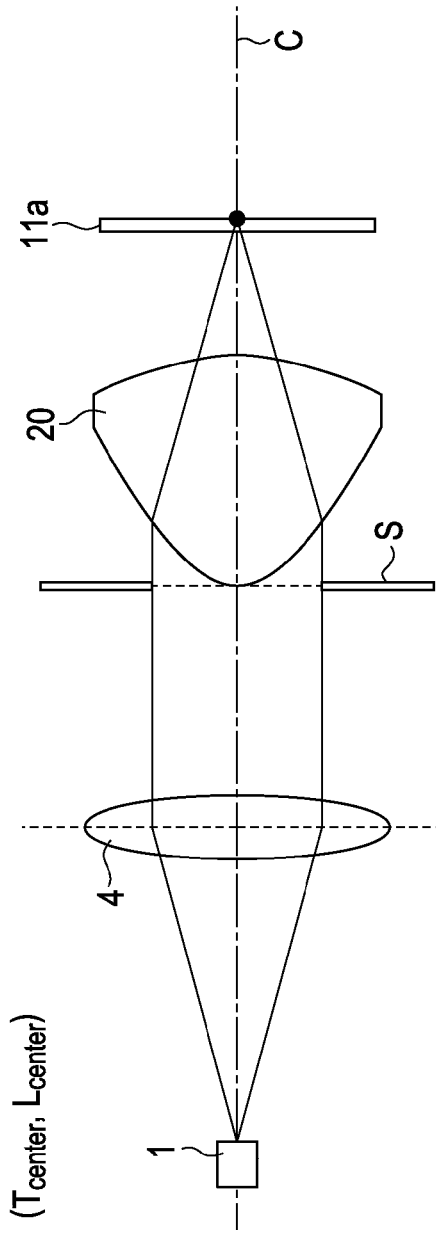
FIG. 3A is a schematic view of a main part of the optical pickup apparatus in a state of the design center.
Figure 3B:
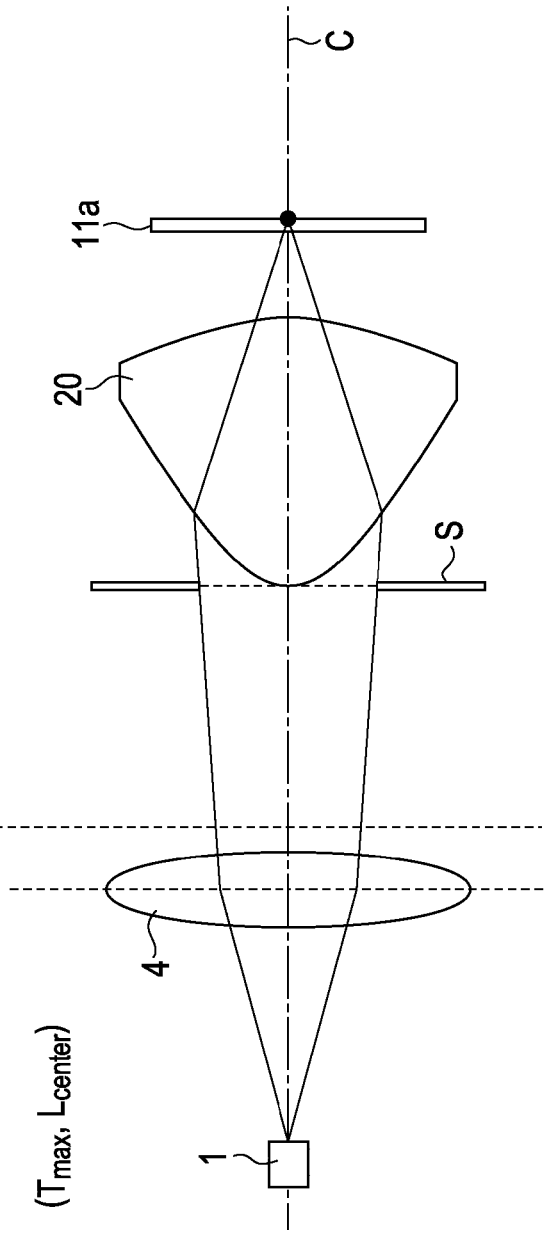
FIG. 3B is a schematic view of a main part of the optical pickup apparatus when a change in temperature is at the maximum.
Figure 4A:
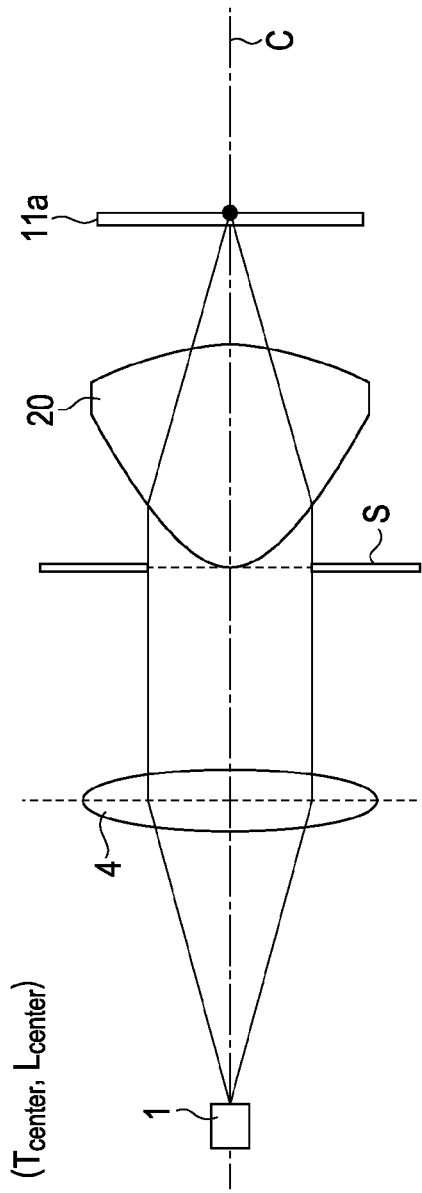
FIG. 4A is a schematic view of a main part of the optical pickup apparatus in a state of the design center.
Figure 4B:
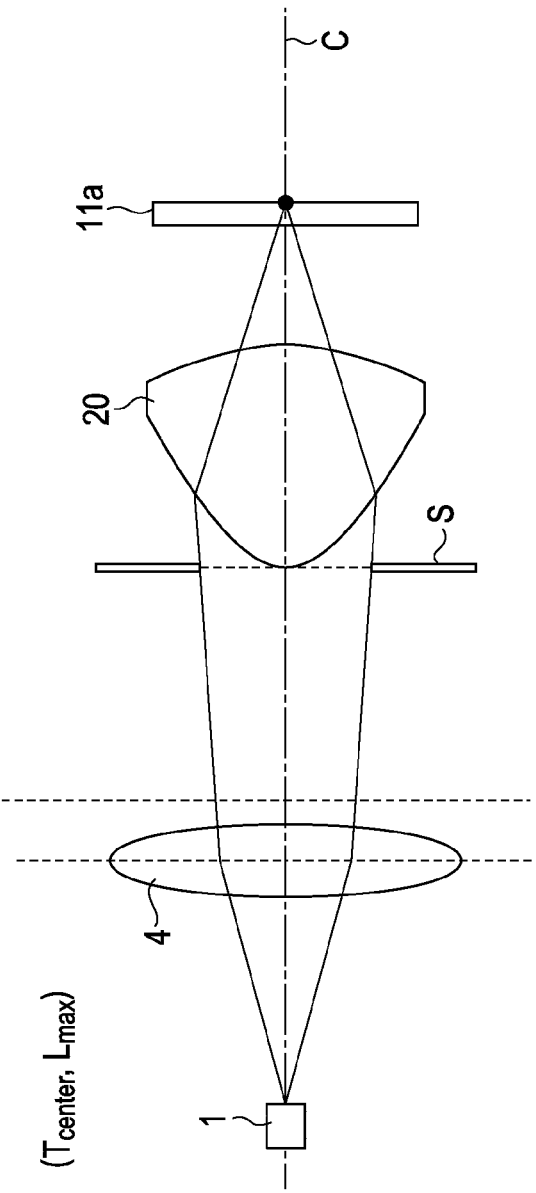
FIG. 4B is a schematic view of a main part of the optical pickup apparatus when a change in the thickness of a cover layer is at the maximum.

Referring to FIGS. 3 and 4, an objective lens according to an embodiment of the present invention is described. FIGS. 3A, 3B, 4A, and 4B are schematic views of a main part of an optical pickup apparatus including the objective lens 20 of the embodiment. These figures illustrate a state in which light at a wavelength of, for example, 405 nm is emitted from the light source 1, the light travels through the collimating lens 4 and the objective lens 20, and the light is incident on a cover layer 11a of an optical recording medium (not shown). The symbol S schematically shows a slit that defines an entrance pupil.

FIG. 3A illustrates a case in which the temperature is at the center temperature $T_{center}$ and the thickness of the cover layer 11a is at the design center thickness $L_{center}$. FIG. 3B illustrates a case in which the temperature is at the maximum temperature $T_{max}$, and the thickness of the cover layer 11a is at the design center thickness $L_{center}$. FIG. 4A, as with FIG. 3A, illustrates a case in which the temperature is at the center temperature $T_{center}$ and the thickness of the cover layer 11a is at the design center thickness $L_{center}$. FIG. 4B illustrates a case in which the temperature is the center temperature $T_{center}$ and the thickness of the cover layer 11a is at the maximum thickness $L_{max}$. The change in the thickness of the cover layer 11a corresponds to the thickness of an intermediate layer if the recording layer is multi-layered and includes an error that is generated when the cover layer (intermediate layer) is manufactured. The blue band optical recording medium described above has a cover layer (intermediate layer) having an index of refraction in the range of 1.45 to 1.70.

The objective lens 20 is configured such that ratios among disc spherical aberration, temperature spherical aberration, and magnification spherical aberration have predetermined relationships. That is, for the objective lens 20, expressions $$0.83 < (p_M/p_L) < 1.17 \text{ and } 0.83 < (p_M/p_T) < 1.17$$

or expressions $$0.80 < (p_M/p_L) < 1.20 \text{ and } 0.86 < (p_M/p_T) < 1.14$$

are satisfied, where $p_L$ is the ratio of fifth-order spherical aberration to third-order spherical aberration, the spherical aberrations being caused by a difference in the thickness of the cover layer 11a of an optical recording medium, $p_T$ is the ratio of fifth-order spherical aberration to third-order spherical aberration, the spherical aberrations being caused by a change in the temperature of the objective lens 20, and $p_M$ is the ratio of fifth-order spherical aberration to third-order spherical aberration, the spherical aberrations being caused by a change in incident magnification.

With this configuration, as shown in FIG. 3B, even when a change in the temperature of the environment of the objective lens 20 is at $T_{max}$, third-order and fifth-order temperature spherical aberrations, which are third-order and fifth-order spherical aberrations caused by a change in temperature, are within a predetermined range. Moreover, as shown in FIG. 4B, even when a change in the thickness of the cover layer 11a is at $L_{max}$, third-order and fifth-order disc spherical aberrations, which are third-order and fifth-order spherical aberrations caused by a change in the thickness of the cover layer 11a, are within a predetermined range. The principle behind these is described in detail in the following section for a method of correcting aberration.

[4] METHOD OF CORRECTING ABERRATION

A method of correcting aberration according to an embodiment of the present invention is described in detail.

As described above, the design center thickness of the cover layer is denoted by $L_{center}$, and the design center temperature is denoted by $T_{center}$. The assumed maximum thickness of the cover layer is denoted by $L_{max}$, and the assumed minimum thickness of the cover layer is denoted by $L_{min}$. Likewise, the assumed maximum temperature is denoted by $T_{max}$, and the assumed minimum temperature is denoted by $T_{min}$. The third-order aberration and the fifth-order spherical aberration in each case are denoted by adding subscripts to these notations. For example, third-order spherical aberration caused when the thickness of the cover layer is at the design center and the temperature is at the design center is denoted by $SA3_{Lcenter,Tcenter}$.

Spherical aberration that occurs when the thickness of the cover layer is at $L_{max}$ and the temperature is at $T_{max}$ is described below as an example. A change in the thickness of the cover layer is denoted by $\Delta L \ (=L_{max}-L_{center})$, and a change in temperature is denoted by $\Delta T \ (=T_{max}-T_{center})$. The slopes of third-order and fifth-order disc spherical aberrations and the slopes of third order and fifth-order temperature spherical aberrations are denoted as described below.

$\overline{SA3(L)}$: slope of third-order spherical aberration with respect to change in thickness of cover layer $\overline{SA5(L)}$: slope of fifth-order spherical aberration with respect to change in thickness of cover layer
$\overline{SA3(T)}$: slope of third-order spherical aberration with respect to change in temperature
$\overline{SA5(T)}$: slope of fifth-order spherical aberration with respect to change in temperature The spherical aberrations $SA3_{Lmax,Tmax}$ and $SA5_{Lmax,Tmax}$ can be approximated by the following expressions (1) and (2), respectively.

$$SA3_{L_{max},T_{max}} = \overline{SA3(L)}\Delta L + \overline{SA3(T)}\Delta T + SA3_{Lcenter,Tcenter} \quad (1)$$

$$SA5_{L_{max},T_{max}} = \overline{SA5(L)}\Delta L + \overline{SA5(T)}\Delta T + SA5_{Lcenter,Tcenter} \quad (2)$$

Spherical aberration can be suppressed by changing the incident magnification of the objective lens 20 (by changing the position of the collimating lens 4). If the incident magnification is to be determined such that expression (1) for third-order spherical aberration is equal to 0, the incident magnification M is represented by expression (4) that is derived from expression (3).

$$SA3_{L_{max},T_{max}} - M\overline{SA3(M)} = \quad (3)$$
$$(\overline{SA3(L)}\Delta L + \overline{SA3(T)}\Delta T + SA3_{Lcenter,Tcenter}) - M\overline{SA3(M)} = 0$$

$$M = \frac{\overline{SA3(L)}}{\overline{SA3(M)}}\Delta L + \frac{\overline{SA3(T)}}{\overline{SA3(M)}}\Delta T + \frac{SA3_{Lcenter,Tcenter}}{\overline{SA3(M)}} \quad (4)$$

In expressions (3) and (4), the slope of the third-order magnification spherical aberration is denoted by the following expression.
$\overline{SA3(M)}$: slope of third-order spherical aberration with respect to change in magnification When the incident magnification is at M, the residual value of the fifth-order spherical aberration is represented by expression (5).

$$SA5_{L_{max},T_{max}} - M\overline{SA5(M)} = \quad (5)$$
$$(\overline{SA5(L)}\Delta L + \overline{SA5(T)}\Delta T + SA5_{Lcenter,Tcenter}) - M\overline{SA5(M)} =$$
$$\overline{SA5(L)}\Delta L\left(1 - \frac{\overline{SA3(L)}}{\overline{SA5(L)}}\frac{\overline{SA5(M)}}{\overline{SA3(M)}}\right) +$$
$$\overline{SA5(T)}\Delta T\left(1 - \frac{\overline{SA3(T)}}{\overline{SA5(T)}}\frac{\overline{SA5(M)}}{\overline{SA3(M)}}\right) + SA5_{Lcenter,Tcenter} -$$
$$SA3_{Lcenter,Tcenter}\frac{\overline{SA5(M)}}{\overline{SA3(M)}} = \overline{SA5(L)}\Delta L\left(1 - \frac{p_M}{p_L}\right) +$$
$$\overline{SA5(T)}\Delta T\left(1 - \frac{p_M}{p_T}\right) + SA5_{Lcenter,Tcenter} - SA3_{Lcenter,Tcenter}p_M$$

The following expressions (6), (7), and (8) represent $p_M$, $p_L$, and $p_T$, which are, respectively, the ratio of fifth order magnification spherical aberration to third order magnification spherical aberration, the ratio of fifth order disc spherical aberration to third order disc spherical aberration, and the ratio of fifth order temperature spherical aberration to third order temperature spherical aberration.

$$p_M = \overline{SA5(M)}/\overline{SA3(M)} \quad (6)$$

$$p_L = \overline{SA5(L)}/\overline{SA3(L)} \quad (7)$$

$$p_T = \overline{SA5(T)}/\overline{SA3(T)} \quad (8)$$

The objective lens 20 is designed such that, in a state in which the values of $SA3_{Lcenter,Tcenter}$ and $SA5_{Lcenter,Tcenter}$, which are the spherical aberrations at the design center, are adjusted to be zero as described above, the expression $$p_M = p_L = p_T \quad (9)$$

holds. Thus, by changing the incident magnification, third- and fifth-order spherical aberrations caused by a change in the thickness of the cover layer and a change in the temperature of the environment of the objective lens can be simultaneously suppressed.

Although description has been made for the case of $L_{max}$ and $T_{max}$, the same conclusion applies to the other cases.

Point image intensity I is represented by expression (10). To make the value of I equal to or greater than about 0.99, the wavefront aberration $W_{rms}$ is set at $0.010\lambda_{rms}$. The residual value of fifth-order spherical aberration equal to or smaller than $0.010\lambda_{rms}$ is discussed below.

$$I = 1 - (2\pi W_{rms})^2 \quad (10)$$

As described above, the residual value of the fifth-order spherical aberration is represented by expression (5). If $SA3_{Lcenter,Tcenter}$ and $SA5_{Lcenter,Tcenter}$, which are the aberrations at the design center, are adjusted to be zero, the following expression (11) is obtained.

$$\left|\overline{SA5(L)}\Delta L\left(1 - \frac{p_M}{p_L}\right) + \overline{SA5(T)}\Delta T\left(1 - \frac{p_M}{p_T}\right)\right| < 0.01 \quad (11)$$

The values shown in expressions (12) and (13) are used as the design center values.

$$\overline{SA5(L)} = -0.002 \quad (12)$$

$$\overline{SA5(T)} = -0.001 \quad (13)$$

The values of $\Delta L$ and $\Delta T$ are substituted by the following values.

$$\Delta L = 12.5 \quad (14)$$

$$\Delta T = 35.0 \quad (15)$$

At this time, as the ranges of $p_M/p_L$ and $p_M/p_T$, expressions $$0.83 < p_M/p_L < 1.17 \text{ and } 0.83 < p_M/p_T < 1.17 \quad (16)$$

are used. Alternatively, expressions $$0.80 < p_M/p_L < 1.20 \text{ and } 0.86 < p_M/p_T < 1.14 \quad (17)$$

are obtained.

Figure 5:
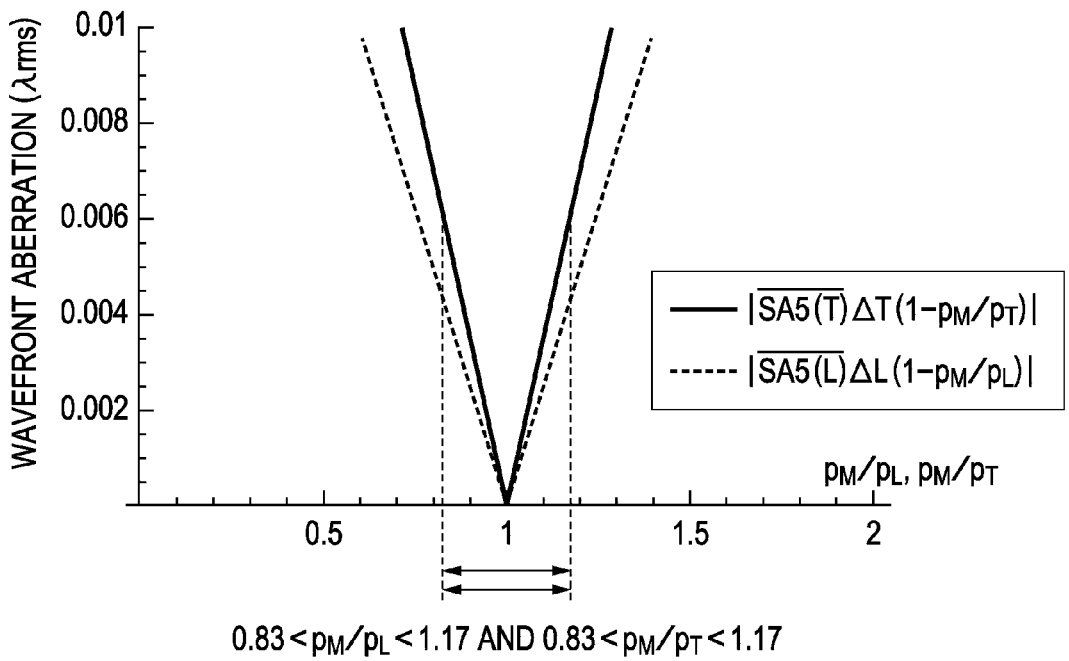
FIG. 5 is a graph showing a change in wavefront aberration against the ratio of magnification spherical aberration to disc spherical aberration, and a change in wavefront aberration against the ratio of magnification spherical aberration to temperature spherical aberration.
Figure 6:
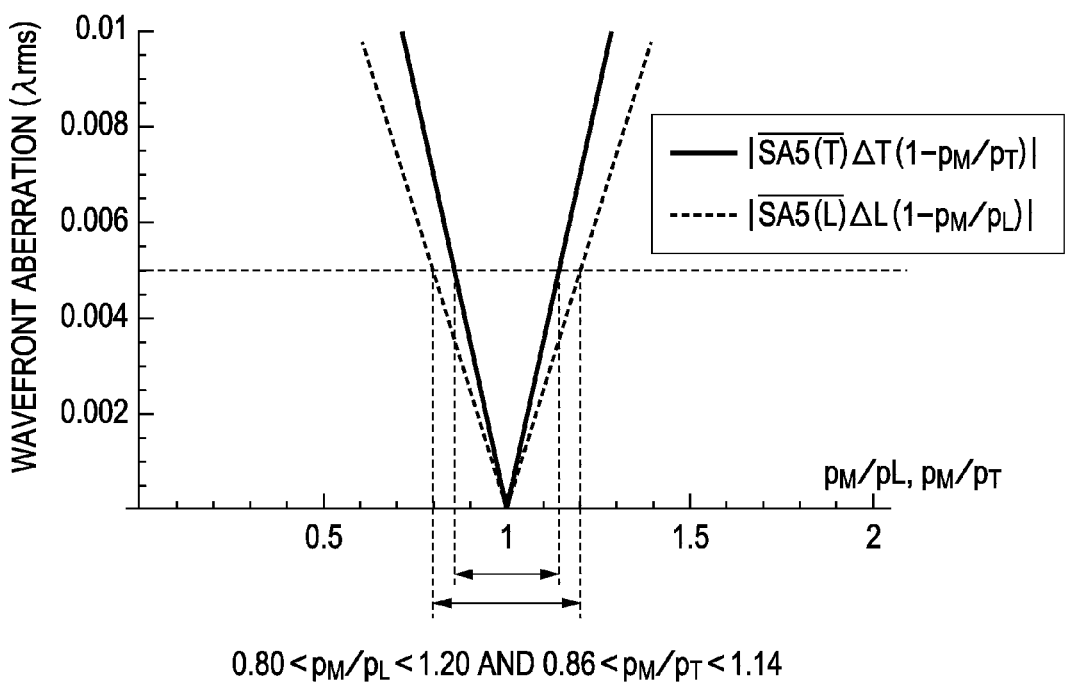
FIG. 6 is a graph showing a change in wavefront aberration against the ratio of magnification spherical aberration to disc spherical aberration, and a change in wavefront aberration against the ratio of magnification spherical aberration to temperature spherical aberration.

FIGS. 5 and 6 are graphs showing the ranges represented by expressions (16) and expressions (17), respectively. In FIGS. 5 and 6, the horizontal axes represent the ratios $p_M/p_L$ and $p_M/p_T$, respectively. The vertical axes represent wavefront aberration (in $\lambda_{rms}$).

In FIGS. 5 and 6, the solid line and the broken line represent the second term and the first term of expression (11), respectively. The absolute value of the sum of these terms should be smaller than 0.01. That is, FIG. 5 shows the range represented by expressions (16). In the range, the absolute value of the sum of the first term and the second term of expression (11), which have different values, is smaller than 0.01. FIG. 6 shows the range represented by expressions (17). In the range, the absolute value of each of the first term and the second term of expression (11) is smaller than 0.005 ($\lambda_{rms}$).

By using the objective lens described above, the residual aberration can be minimized in an optical system in which third- and fifth-order spherical aberrations caused by a difference in the thickness of the cover layer of the optical recording medium and third- and fifth-order spherical aberrations caused by a change in the temperature of the objective lens are significant. By using the objective lens, third- and fifth-order spherical aberrations can be favorably corrected, whereby a favorable spot shape and a favorable signal pattern can be obtained. Therefore, deterioration of recording and reproduction performance can be suppressed or avoided.

[5] DESIGN EXAMPLES

Design examples of an objective lens for which expressions (16) or expressions (17) are satisfied are described below. In the examples, the aspheric function of the surfaces of the objective lens is represented by f(r) in the following expression. In the examples, the maximum change $\Delta L_{max}$ of the thickness of the cover layer of the optical recording medium is ±12.5 μm, and the maximum change $\Delta T_{max}$ in the temperature of the objective lens is ±35° C.

$$f(r) = \frac{r^2/R}{1+\sqrt{1-(1+K)r^2/R^2}} + Ar^4 + Br^6 + Cr^8 + Dr^{10} + Er^{12} + Fr^{14} + Gr^{16} + Hr^{18} + Jr^{20}$$

(1) Design Example 1

In this example, the thickness of the objective lens along the optical axis is 1.80 mm, and the objective lens is made of a material having an index of refraction of 1.5245. The values of $p_M/p_T=1.0100$ and $p_M/p_L=1.0779$. Table 1 shows the radius of curvature R and the aspheric coefficients K and A to J of the lens surface S1 on the light source side and the lens surface S2 on the disc (optical recording medium) side.

TABLE 1

|   | S1: Lens Surface on Light Source Side | S2: Lens Surface on Disc Side |
|---|---|---|
| R | 0.92557 | −1.21100 |
| K | −0.60684 | −27.13926 |
| A | 0.02141 | 0.23133 |
| B | −0.00050 | −0.18987 |
| C | 0.00808 | −0.26925 |
| D | 0.00647 | 0.37981 |
| E | −0.00382 | −0.00964 |
| F | −0.00705 | −0.10854 |
| G | 0.00371 | −0.00587 |
| H | 0.00852 | −0.03997 |
| J | −0.00580 | 0.04787 | thickness of lens = 1.80 [mm],
index of refraction = 1.5245,
$p_M/p_T = 1.0100$,
$p_M/p_L = 1.0779$ (2) Design Example 2

In this example, the thickness of the objective lens along the optical axis is 1.80 mm, and the objective lens is made of a material having an index of refraction of 1.5245. The values of $p_M/p_T=1.1117$ and $p_M/p_L=1.0571$. Table 2 shows the radius of curvature R and the aspheric coefficients K and A to J of the lens surface S1 on the light source side and the lens surface S2 on the disc (optical recording medium) side.

TABLE 2

|   | S1: Lens Surface on Light Source Side | S2: Lens Surface on Disc Side |
|---|---|---|
| R | 0.92683 | −1.20829 |
| K | −0.58514 | −27.06438 |
| A | 0.01500 | 0.27105 |
| B | 0.00923 | −0.29500 |
| C | −0.00566 | −0.17308 |
| D | 0.01195 | 0.40213 |
| E | −0.00229 | −0.03969 |
| F | −0.00762 | −0.23416 |
| G | 0.00252 | 0.10867 |
| H | 0.00904 | 0.00000 |
| J | −0.00587 | 0.00000 | thickness of lens = 1.80 [mm],
index of refraction = 1.5245,
$p_M/p_T = 1.1117$,
$p_M/p_L = 1.0571$ (3) Design Example 3

In this example, the thickness of the objective lens along the optical axis is 1.80 mm, and the objective lens is made of a material having an index of refraction of 1.5245. The values of $p_M/p_T=0.9723$ and $p_M/p_L=1.0520$. Table 3 shows the radius of curvature R and the aspheric coefficients K and A to J of the lens surface S1 on the light source side and the lens surface S2 on the disc (optical recording medium) side.

TABLE 3

|   | S1: Lens Surface on Light Source Side | S2: Lens Surface on Disc Side |
|---|---|---|
| R | 0.92468 | −1.21376 |
| K | −0.60630 | −27.3463 |
| A | 0.02079 | 0.23159 |
| B | 0.00113 | −0.19838 |
| C | 0.00691 | −0.26222 |
| D | 0.00563 | 0.39336 |
| E | −0.00346 | −0.00833 |
| F | −0.00615 | −0.16354 |
| G | 0.00335 | 0.00648 |
| H | 0.00839 | 0.03487 |
| J | −0.00580 | 0.00000 | thickness of lens = 1.80 [mm],
index of refraction = 1.5245,
$p_M/p_T = 0.9723$,
$p_M/p_L = 1.0520$ (4) Design Example 4

In this example, the thickness of the objective lens along the optical axis is 1.80 mm, and the objective lens is made of a material having an index of refraction of 1.5245. The values of $p_M/p_T=0.9928$, and $p_M/p_L=1.0657$. Table 4 shows the radius of curvature R and the aspheric coefficients K and A to J of the lens surface S1 on the light source side and the lens surface S2 on the disc (optical recording medium) side.

TABLE 4

|   | S1: Lens Surface on Light Source Side | S2: Lens Surface on Disc Side |
|---|---|---|
| R | 0.92485 | −1.21305 |
| K | −0.60493 | −26.9065 |
| A | 0.02074 | 0.23301 |
| B | 0.00036 | −0.19675 |
| C | 0.00732 | −0.26352 |

TABLE 4-continued

|   | S1: Lens Surface on Light Source Side | S2: Lens Surface on Disc Side |
|---|---|---|
| D | 0.00573 | 0.39111 |
| E | −0.00359 | −0.00731 |
| F | −0.00627 | −0.15972 |
| G | 0.00334 | 0.00350 |
| H | 0.00847 | 0.03490 |
| J | −0.00580 | 0.00000 | thickness of lens = 1.80 [mm],
index of refraction = 1.5245,
$p_M/p_T = 0.9928$,
$p_M/p_L = 1.0657$ (5) Design Example 5

In this example, the thickness of the objective lens along the optical axis is 1.80 mm, and the objective lens is made of a material having an index of refraction of 1.5245. The values of $p_M/p_T = 0.5809$ and $p_M/p_L = 0.7919$. Table 5 shows the radius of curvature R and the aspheric coefficients K and A to J of the lens surface S1 on the light source side and the lens surface S2 on the disc (optical recording medium) side.

TABLE 5

|   | S1: Lens Surface on Light Source Side | S2: Lens Surface on Disc Side |
|---|---|---|
| R | 0.92217 | −1.21160 |
| K | −0.60252 | −30.8263 |
| A | 0.04308 | 0.21404 |
| B | −0.18429 | −0.22308 |
| C | 0.87401 | −0.22864 |
| D | −2.33998 | 0.40105 |
| E | 3.87128 | 0.03302 |
| F | −3.97938 | −0.20874 |
| G | 2.47293 | −0.06372 |
| H | −0.84513 | 0.09944 |
| J | 0.12005 | 0.00000 | thickness of lens = 1.80 [mm],
index of refraction = 1.5245,
$p_M/p_T = 0.5809$,
$p_M/p_L = 0.7919$ (6) Residual Fifth-Order Spherical Aberration For each of the design examples 1 to 5, the residual fifth-order spherical aberration when the thickness of the cover layer of the optical recording medium is changed from the minimum to the maximum and when the temperature of the objective lens is changed from the minimum to the maximum are calculated. The results of the calculation are shown in Tables 6 to 10, which correspond to the design examples 1 to 5, respectively.

TABLE 6

|   | Tmin | Tcenter | Tmax |
|---|---|---|---|
| Lmin | 6.1 | −1.2 | −1.3 |
| Lcenter | 6.1 | 0.3 | −0.2 |
| Lmax | 6.0 | 0.2 | 0.2 |

(unit: $m\lambda_{rms}$)

TABLE 7

|   | Tmin | Tcenter | Tmax |
|---|---|---|---|
| Lmin | −7.7 | −6.8 | 0.3 |
| Lcenter | −5.1 | −3.3 | 3.1 |
| Lmax | −2.7 | −1.3 | 5.4 |

(unit: $m\lambda_{rms}$)

TABLE 8

|   | Tmin | Tcenter | Tmax |
|---|---|---|---|
| Lmin | 8.6 | −0.2 | −1.8 |
| Lcenter | 8.0 | 0.6 | −1.2 |
| Lmax | 7.4 | 0.0 | −1.2 |

(unit: $m\lambda_{rms}$)

TABLE 9

|   | Tmin | Tcenter | Tmax |
|---|---|---|---|
| Lmin | 2.4 | −6.6 | −7.6 |
| Lcenter | 1.3 | −5.7 | −6.7 |
| Lmax | 0.8 | −5.9 | −6.4 |

(unit: $m\lambda_{rms}$)

TABLE 10

|   | Tmin | Tcenter | Tmax |
|---|---|---|---|
| Lmin | 35.7 | 7.8 | −13.4 |
| Lcenter | 29.6 | 2.1 | −19.2 |
| Lmax | 23.3 | −4.3 | −25.8 |

(unit: $m\lambda_{rms}$)

These results show that, for the design examples 1 to 4 of the objective lens according to the embodiment of the present invention, for which expressions (16) or expressions (17) are satisfied, the residual fifth-order aberration is smaller than 10 $m\lambda_{rms}$ (0.01 $\lambda_{rms}$). In contrast, for the objective lens of the design example 5, the residual fifth-order aberration is larger than 10 $m\lambda_{rms}$, which implies that fifth-order aberration, in particular, fifth-order temperature spherical aberration is not completely removed.

The present application contains subject matter related to that disclosed in Japanese Priority Patent on Oct. 28, 2008, the entire content of which is hereby incorporated by reference.

The present invention is not limited to the embodiments described above. Various modifications and alterations may occur insofar as they are within the scope of the present invention.

What is claimed is:

1. An objective lens, wherein:
the objective lens is made of plastic;
the objective lens has a numerical aperture equal to or greater than 0.80; and
an expression $$\left| \overline{SA5(L)} \Delta L \left(1 - \frac{p_M}{p_L}\right) + \overline{SA5(T)} \Delta T \left(1 - \frac{p_M}{p_T}\right) \right| < 0.01\ \lambda_{rms}$$

is satisfied, wherein:
$p_L$ is a ratio of a layer-based fifth-order spherical aberration to a layer-based third-order spherical aberration, the layer-based fifth-order spherical aberration and the layer-based third-order spherical aberration being caused by a change in a thickness of a cover layer of an optical recording medium;

$p_T$ is a ratio of a temperature-based fifth-order spherical aberration to a temperature-based third-order spherical aberration, the temperature-based fifth-order spherical aberration and the temperature-based third-order spherical aberration being caused by a change in temperature of an environment of the objective lens;

$p_M$ is a ratio of a magnification-based fifth-order spherical aberration to a magnification-based third-order spherical aberration, the magnification-based fifth-order spherical aberration and the magnification-based third-order spherical aberration being caused by a change in incident magnification;

expressions $$0.83<(p_M/p_L)<1.17 \text{ and } 0.83<(p_M/p_T)<1.17$$

or expressions $$0.80<(p_M/p_L)<1.20 \text{ and } 0.86<(p_M/p_T)<1.14$$

are satisfied;

$\overline{SA5(L)}$ is a slope of the layer-based fifth-order spherical aberration;

$\overline{SA5(T)}$ is a slope of the temperature-based fifth-order spherical aberration;

$\Delta L$ is the change in the thickness of the cover layer; and $\Delta T$ is the change in the temperature of the environment of the objective lens.

2. The objective lens of claim 1, wherein the absolute value of the temperature-based fifth-order spherical aberration is less than $0.002\lambda_{rms}$ and the absolute value of the layer-based fifth-order spherical aberration is less than $0.001\lambda_{rms}$.

3. The objective lens of claim 2, wherein $\Delta L$ is less than or equal to 12.5 μm and $\Delta T$ is less than or equal to 35° C.

4. An optical pickup apparatus, comprising:
a light source;
an objective lens made of plastic and having a numerical aperture equal to or greater than 0.80;
an optical system for guiding light emitted by the light source to the objective lens; and
a driving unit for moving the objective lens to a predetermined position at which the objective lens faces an optical recording medium,
wherein, for the objective lens, an expression $$\left|\overline{SA5(L)}\Delta L\left(1-\frac{p_M}{p_L}\right)+\overline{SA5(T)}\Delta T\left(1-\frac{p_M}{p_T}\right)\right|<0.01\ \lambda_{rms}$$

is satisfied, wherein:

$p_L$ is a ratio of a layer-based fifth-order spherical aberration to a layer-based third-order spherical aberration, the layer-based fifth-order spherical aberration and the layer-based third-order spherical aberration being caused by a change in a thickness of a cover layer of an optical recording medium;

$p_T$ is a ratio of a temperature-based fifth-order spherical aberration to a temperature-based third-order spherical aberration, the temperature-based fifth-order spherical aberration and the temperature-based third-order spherical aberration being caused by a change in temperature of an environment of the objective lens;

expressions $$0.83<(p_M/p_L)<1.17 \text{ and } 0.83<(p_M/p_T)<1.17$$

or expressions $$0.80<(p_M/p_L)<1.20 \text{ and } 0.86<(p_M/p_T)<1.14$$

are satisfied;

$p_M$ is a ratio of a magnification-based fifth-order spherical aberration to a magnification-based third-order spherical aberration, the magnification-based fifth-order spherical aberration and the magnification-based third-order spherical aberration being caused by a change in incident magnification;

$\overline{SA5(L)}$ is a slope of the layer-based fifth-order spherical aberration;

$\overline{SA5(T)}$ is a slope of the temperature-based fifth-order spherical aberration;

$\Delta L$ is the change in the thickness of the cover layer; and $\Delta T$ is the change in the temperature of the environment of the objective lens.

5. The optical pickup apparatus of claim 4, wherein, the absolute value of the temperature-based fifth-order spherical aberration is less than $0.002\lambda_{rms}$ and the absolute value of the layer-based fifth-order spherical aberration is less than $0.001\lambda_{rms}$.

6. The optical pickup apparatus of claim 5, wherein $\Delta L$ is less than or equal to 12.5 μm and $\Delta T$ is less than or equal to 35° C.

7. The optical pickup apparatus of claim 4, wherein the light source emits light at a wavelength of 405±8 nm.

8. The optical pickup apparatus of claim 4, further comprising:
a collimating lens whose position can be adjusted by being moved along an optical axis,
wherein the collimating lens serves to correct, by using the third- and fifth-order spherical aberrations caused by a change in incident magnification, the third- and fifth-order spherical aberrations caused by a difference in the thickness of the cover layer of the optical recording medium and the third- and fifth-order spherical aberrations caused by a change in temperature.

9. An optical recording/reproduction apparatus comprising:
an optical pickup apparatus including:
a light source;
an objective lens made of plastic and having a numerical aperture equal to or greater than 0.80;
an optical system for guiding light emitted by the light source to the objective lens;
a driving unit for moving the objective lens to a predetermined position at which the objective lens faces an optical recording medium; and
a photodetector for detecting feedback light of light concentrated on the optical recording medium by the objective lens, the feedback light being reflected from the recording layer of the optical recording medium,
wherein, for the objective lens, an expression $$\left|\overline{SA5(L)}\Delta L\left(1-\frac{p_M}{p_L}\right)+\overline{SA5(T)}\Delta T\left(1-\frac{p_M}{p_T}\right)\right|<0.01\ \lambda_{rms}$$

is satisfied, wherein:

$p_L$ is a ratio of a layer-based fifth-order spherical aberration to a layer-based third-order spherical aberration, the layer-based fifth-order spherical aberration and the layer-based third-order spherical aberration being caused by a change in a thickness of a cover layer of an optical recording medium;

$p_T$ is a ratio of a temperature-based fifth-order spherical aberration to a temperature-based third-order spherical aberration, the temperature-based fifth-order spherical aberration and the temperature-based third-order spherical aberration being caused by a change in temperature of an environment of the objective lens;

$p_M$ is a ratio of a magnification-based fifth-order spherical aberration to a magnification-based third-order spherical aberration, the magnification-based fifth-order spherical aberration and the magnification-based third-order spherical aberration being caused by a change in incident magnification;

expressions $$0.83<(p_M/p_L)<1.17 \text{ and } 0.83<(p_M/p_T)<1.17$$

or expressions $$0.80<(p_M/p_L)<1.20 \text{ and } 0.86<(p_M/p_T)<1.14$$

are satisfied;

$\overline{SA5(L)}$ is a slope of the layer-based fifth-order spherical aberration;

$\overline{SA5(T)}$ is a slope of the temperature-based fifth-order spherical aberration;

$\Delta L$ is the change in the thickness of the cover layer; and $\Delta T$ is the change in the temperature of the environment of the objective lens.

10. The optical recording/reproduction apparatus of claim 9, wherein, the absolute value of the temperature-based fifth-order spherical aberration is less than $0.002\lambda_{rms}$ and the absolute value of the layer-based fifth-order spherical aberration is less than $0.001\lambda_{rms}$.

11. The optical recording/reproduction apparatus of claim 10, wherein $\Delta L$ is less than or equal to 12.5 μm and $\Delta T$ is less than or equal to 35° C.

12. The optical recording/reproduction apparatus of claim 9, wherein the optical pickup apparatus further includes a collimating lens whose position can be adjusted by being moved along an optical axis, and wherein aberration is corrected by moving the collimating lens along the optical axis and adjusting the position of the collimating lens.

13. A method of correcting aberration, comprising the steps of:

using an objective lens made of plastic and having a numerical aperture equal to or greater than 0.80;

concentrating light on a recording layer of an optical recording medium; and performing at least one of recording and reproduction of information, wherein, for the objective lens, an expression $$\left| \overline{SA5(L)}\Delta L\left(1 - \frac{p_M}{p_L}\right) + \overline{SA5(T)}\Delta T\left(1 - \frac{p_M}{p_T}\right) \right| < 0.01 \, \lambda_{rms}$$

is satisfied, wherein:

$p_L$ is a ratio of a layer-based fifth-order spherical aberration to a layer-based third-order spherical aberration, the layer-based fifth-order spherical aberration and the layer-based third-order spherical aberration being caused by a change in a thickness of a cover layer of an optical recording medium;

$p_T$ is a ratio of a temperature-based fifth-order spherical aberration to a temperature-based third-order spherical aberration, the temperature-based fifth-order spherical aberration and the temperature-based third-order spherical aberration being caused by a change in temperature of an environment of the objective lens;

$p_M$ is a ratio of a magnification-based fifth-order spherical aberration to a magnification-based third-order spherical aberration, the magnification-based fifth-order spherical aberration and the magnification-based third-order spherical aberration being caused by a change in incident magnification;

expressions $$0.83<(p_M/p_L)<1.17 \text{ and } 0.83<(p_M/p_T)<1.17$$

or expressions $$0.80<(p_M/p_L)<1.20 \text{ and } 0.86<(p_M/p_T)<1.14$$

are satisfied;

$\overline{SA5(L)}$ is a slope of the layer-based fifth-order spherical aberration;

$\overline{SA5(T)}$ is a slope of the temperature-based fifth-order spherical aberration;

$\Delta L$ is the change in the thickness of the cover layer; and $\Delta T$ is the change in the temperature of the environment of the objective lens.

14. The method of correcting aberration according to claim 13, wherein, the absolute value of the temperature-based fifth-order spherical aberration is less than $0.002\lambda_{rms}$ and the absolute value of the layer-based fifth-order spherical aberration is less than $0.001\lambda_{rms}$.

15. The method of correcting aberration according to claim 14, wherein $\Delta L$ is less than or equal to 12.5 μm and $\Delta T$ is less than or equal to 35° C.

16. The method of correcting aberration according to claim 14, wherein the light concentrated on the recording layer of the optical recording layer of the optical recording medium has a wavelength of 405±8 nm.

17. The method of correcting aberration according to claim 13, further comprising:

using a collimating lens whose position can be adjusted by being moved along an optical axis, wherein the collimating lens serves to correct, by using the third- and fifth-order spherical aberrations caused by a change in incident magnification, the third- and fifth-order spherical aberrations caused by a difference in the thickness of the cover layer of the optical recording medium and the third- and fifth-order spherical aberrations caused by a change in temperature.

* * * * *